United States Patent
Behrens et al.

(10) Patent No.: US 8,162,543 B2
(45) Date of Patent: Apr. 24, 2012

(54) METHOD TO CORRECT IMAGING ERRORS OF AN X-RAY IMAGE INTENSIFIER SYSTEM AND ASSOCIATED X-RAY IMAGE INTENSIFIER SYSTEM

(75) Inventors: Ralf Behrens, Hirschaid (DE); Thilo Hannemann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 173 days.

(21) Appl. No.: 12/554,212

(22) Filed: Sep. 4, 2009

(65) Prior Publication Data

US 2010/0061522 A1 Mar. 11, 2010

(30) Foreign Application Priority Data

Sep. 4, 2008 (DE) .......................... 10 2008 045 720

(51) Int. Cl.
*G01D 18/00* (2006.01)
(52) U.S. Cl. ....................................................... 378/207
(58) Field of Classification Search .................... 378/207
See application file for complete search history.

(56) References Cited

U.S. PATENT DOCUMENTS 4,945,223 A * 7/1990 Beauzamy .............. 250/214 VT
6,956,202 B2 * 10/2005 Sabczynski et al. ....... 250/252.1
2004/0015077 A1 1/2004 Sati et al.
2005/0207539 A1 9/2005 Poppleton
2007/0104313 A1 * 5/2007 Tesic et al. ..................... 378/37

FOREIGN PATENT DOCUMENTS

DE 43 14 768 A1 11/1994
DE 10 2004 028 403 A1 1/2006

* cited by examiner

*Primary Examiner* — Hoon Song
*Assistant Examiner* — Mona M Sanei
(74) *Attorney, Agent, or Firm* — Schiff Hardin LLP

(57) ABSTRACT

An image intensifier system has an image converter tube to convert incident x-ray radiation into visible light and a digital camera system optically downstream of the image converter tube. The camera system has an image sensor to convert the incident, visible light into digital images, and an electronic image processing unit is provided for post-processing of the digital images. In such a system and a method for correcting image distortion errors that occur therein, characteristic data of a magnetic field present in the image converter tube are determined with the aid of a magnetic field probe arranged within the image converter tube or in its environment, an imaging error resulting from the presence of the magnetic field is quantitatively defined using the determined characteristic data, one or more parameters of a correction map leading to the correction of the imaging error are determined based on this, and the correction map that is established in this way is applied to the digital images in the electronic image processing unit.

13 Claims, 2 Drawing Sheets

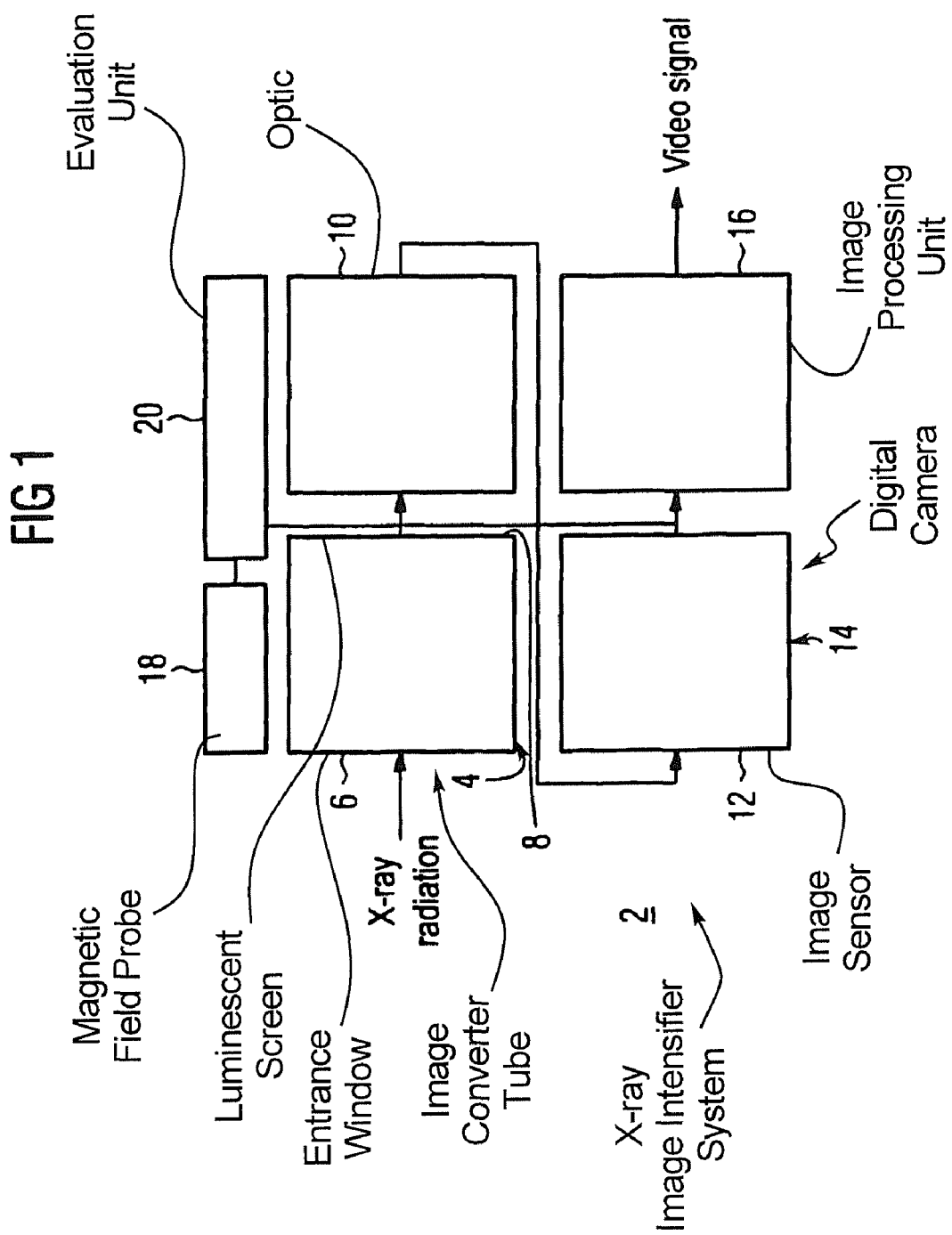

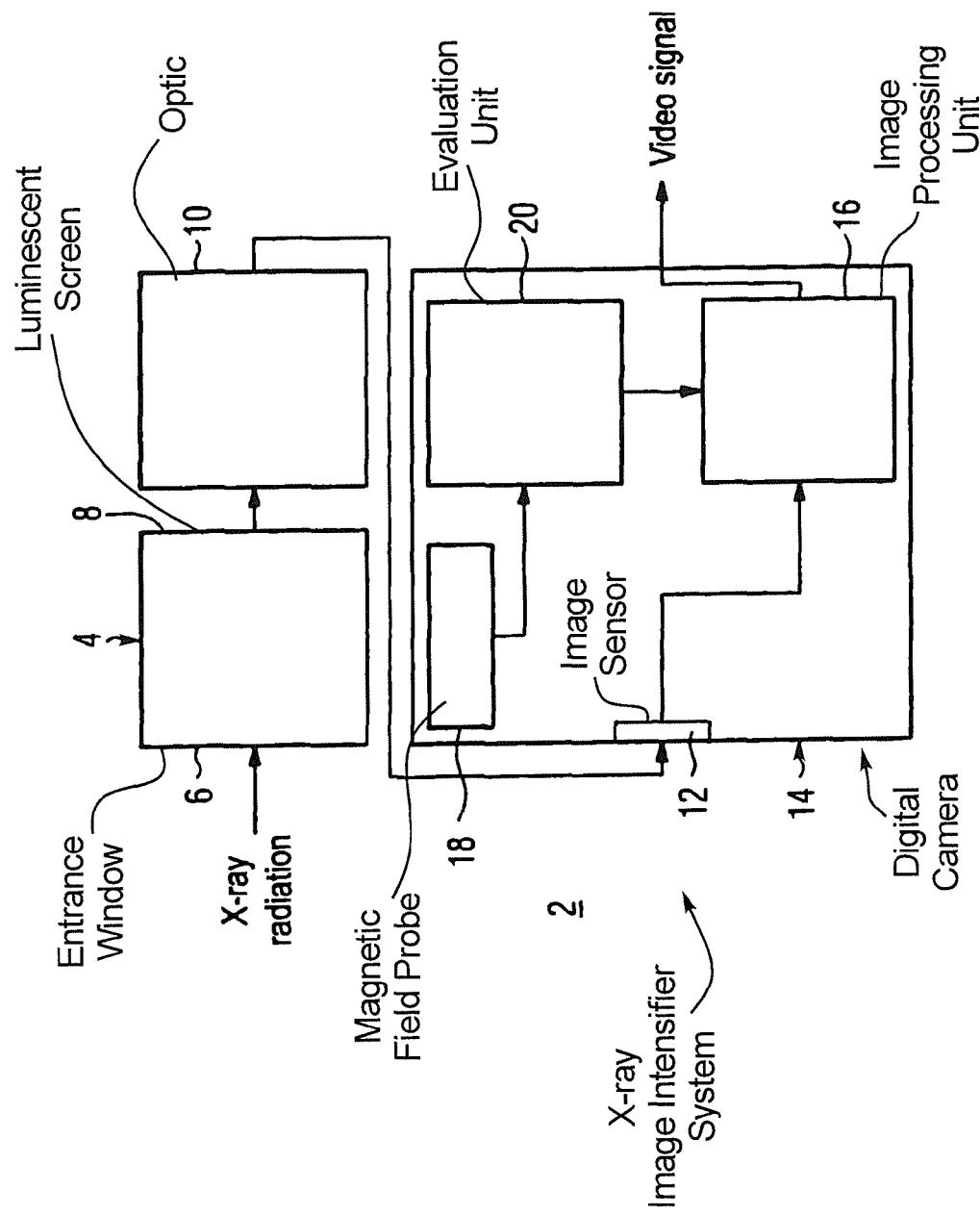

METHOD TO CORRECT IMAGING ERRORS OF AN X-RAY IMAGE INTENSIFIER SYSTEM AND ASSOCIATED X-RAY IMAGE INTENSIFIER SYSTEM

BACKGROUND OF THE INVENTION

1. Field of the Invention

The invention concerns a method to correct imaging errors (in particular distortions) in an x-ray image intensifier system of the type having an image converter tube to convert incident x-ray radiation into visible light and a digital camera system that is optically downstream of the image converter tube, wherein the camera system has an image sensor to convert the incident visible light into digital images, and wherein an electronic image processing unit is provided for post-processing the digital images. The invention furthermore concerns an associated x-ray image intensifier system.

2. Description of the Prior Art

An x-ray image intensifier is preferably used in medical x-ray diagnostics, as well as in materials testing. It converts x-ray radiation incident in an electron tube (also designated as an image converter tube, shortened to image converter or image intensifier) into visible light and amplifies the signal, analogous to an optical image intensifier. A mapping of the x-ray input window to a (usually) smaller optical output window thereby ensues. The enlargement or reduction of the image from the input screen to the output screen can be controlled via suitable selection of the parameters of the image intensifier (for example acceleration voltage, electron optics). This is also called "zoom". The visible light exiting from the output window of the image converter tube is imaged by optics on the image receiver or image sensor of a digital camera and is there transduced into electronically processable digital images or video sequences that can be displayed on a display of an associated display device.

Before being shown on the display, the raw data of the image receiver or image sensor are typically processed in an electronic image processing unit. Various image processing algorithms are typically applied to the camera image in the image processing unit, for example dark current correction, light image correction, sharpness correction, rotation, etc. The design of the image processing depends on the usage purpose of the stated functions. Not all of the aforementioned functions must be realized. The image processing can be integrated into the camera (and therefore into the image intensifier system) or can be arranged separately. It is also possible that only some functions are realized internally in the camera but other functions are external. Given simple tasks, the image processing unit can also be omitted entirely, but for most applications at least rudimentary image processing functions are provided.

The image converter tube of the x-ray image intensifier is based on the principles of electron optics. It is therefore very sensitive to a magnetic field since this deflects the electrons from their path by Lorentz force. This manifests itself in imaging errors, in particular in image deformations or distortions (for example pillow-shaped or barrel-shaped distortions). The problem to be solved is to avoid or to compensate for the image deformations generated by a magnetic field. The Earth's magnetic field already has a visible influence on the image deformation. Therefore corresponding measures can normally not be omitted.

One approach is to shield the image intensifier from the magnetic fields. For example, material known as µ-metal is used for this that forms a shell around the image intensifier. This approach has previously been predominantly used, also in connection with other solution approaches presented in the following. The input window represents the largest problem with this approach. In this region the use of a shielding material in the necessary material thickness is not possible since the high x-ray absorption in the metal foil would require a significant increase of the incident x-ray intensity that would be necessary to achieve an acceptable image quality. This is either not possible in principle without additional measures or is very undesirable (for instance in medical x-ray diagnostics) because this would lead to a severely increased patient dose. For this reason only the lateral surfaces of the x-ray image intensifier are normally sufficiently strongly shielded, but the input window is not, or is only very weakly, shielded. In all cases, foils with a thickness of 25 µm are used in this region that are very complicated and expensive to produce.

In addition or as an alternative to shielding with µ-metal, there is the approach to compensate for the external magnetic fields with a suitable generated counter-field. By the use of a coil arrangement around the image intensifier, an additional magnetic field is generated that cancels the effect of the Earth's magnetic field on the image. For this purpose, the external magnetic field is measured by a magnetic field probe and a matching current for the coil arrangement is generated by an electronic unit. Equipping of the image intensifier with suitable coils and with a reliable arrangement for charging them with current is relatively complicated and cost-intensive. In particular in non-stationary systems, the magnetic field (and therefore the type and the severity of the image deformation) can change very quickly depending on the travel path and alignment of the system in space.

Even without a magnetic field, an image intensifier exhibits an image deformation. The optics following the image intensifier can likewise deform the image. These static deformations should likewise be suppressed or compensated if possible.

SUMMARY OF THE INVENTION

An object of the present invention is to provide a method for correction of imaging errors (in particular of distortions due to magnetic fields) which can be implemented particularly simply and cost-effectively in an x-ray image intensifier system of the aforementioned type, and which delivers reliable results at all times even in non-stationary systems. A further object is to provide an associated x-ray image intensifier system that achieves a particularly reliable correction of imaging errors.

The above object is achieved according to the invention by a method wherein characteristic data of a magnetic field present in the image converter tube are determined with the aid of a magnetic field probe arranged within the image converter tube or in its environment, an imaging error resulting from the presence of the magnetic field is quantitatively defined using the determined characteristic data, one or more parameters of a correction map leading to the correction of the imaging error are determined based on this, and the correction map that is established in this way is applied to the digital images in the electronic image processing unit.

The digital image post-processed in such a way and cleared of imaging errors can then be shown, for example on a display of an associated display unit, or be further processed electronically in another manner.

The invention proceeds from the recognition that the Earth's magnetic field and other static magnetic fields are primarily responsible for the image deformation in an x-ray image intensifier system. Due to their inhomogeneity, these magnetic fields have different effects depending on the position of the image information in space. For example, in a non-stationary, mobile system it would therefore be possible to experimentally determine the image deformations for different spatial positions (for instance for the end points of possible travel paths) and to compensate for them by means of electronic image processing. The image deformation would thus be defined once in the manner of a calibration measurement for a number of pre-established travel positions, and the position-related deformation parameters so determined would be correspondingly stored. The images later acquired at these positions can be corrected using these data. However, such a procedure would have the disadvantage that only specific spatial positions would be measured with regard to the image deformation present there. The system controller would have to ensure that preferably only the previously measured spatial positions are taken up. However, dynamic variations of the local magnetic field strength—for example due to surrounding electrical systems and installations or due to a temporally varying shielding of the Earth's magnetic field, could not be detected at all in this way and be taken into account in the correction of the imaging errors.

To avoid such difficulties, a magnetic field probe is mounted in proximity to or even inside the image intensifier (i.e. the image converter tube). The image deformation resulting from the presence of the magnetic field in the image converter tube is calculated by means of a physical/mathematical model based on the measurement values of the probe. A suitable correction map or, respectively, image transformation is then determined via "back-calculation". This correction map is applied in the manner of a graphic filter in the electronic image processing unit to the digital images acquired by the digital camera. This means that the image deformation due to magnetic fields is compensated via a targeted and automated electronic image processing.

The model describes the connection between measured magnetic field strength and direction and the resulting image deformation under consideration of the current zoom format of the image intensifier. There are various solution approaches for the realization of this model. For example, the connection can be described by mathematical formulas that result from the physics of the image intensifier, for instance in the manner of a first approximation, possibly expanded with correction terms of a higher order. It is also possible to experimentally measure the image deformation for different magnetic field strengths and directions as well as zoom factors and to store them in a table or database. This measurement is advantageously conducted only on a sample from a series of image intensifiers and can then be ascribed to the entire series. It is also possible to combine mathematical and experimental methods. Only partial aspects of the image deformation are thereby mathematically described; other partial aspects are based on experimentally determined empirical values.

The magnetic field is a vector field with three components. The magnetic field probe is advantageously set up and mounted at the image intensifier so that the components of the magnetic field that it determines cause image deformations orthogonal to one another. The computing effort for the model is thereby reduced since every spatial direction can thereby be considered individually (in any case in good approximation) through the decoupling that is therefore produced. Depending on the required quality of the compensation, it can also be sufficient to determine only one or two of the magnetic field components.

The "back-calculation" from the image deformation caused by the magnetic field to the mapping required for correction ensues by direct, iterative or numerical inversion of the underlying model equations, for example, or using tables or database relations. The back-calculation of the image deformation is advantageously realized so that it is produced in a step with a possibly present correction of the static image deformation of the image intensifier and the corrected optic, as well as with a possibly implemented image rotation. Such operations are advantageously conducted in real time, such that the current image cleared of errors is always visible on the associated display.

It is advantageous for the correction of the image deformation by image processing to be conducted directly in the camera; the associated evaluation unit with the model system implemented in it is thus integrated into the camera. Furthermore, it is useful to likewise mount the magnetic field probe as a component of the camera, thus outside of the image converter tube. Even given a mounting of the magnetic field probe on the camera, the magnetic field probe is in the normal case firmly connected with the image converter tube and therefore follows its movement in space.

In the event that the image converter tube is magnetically shielded from the environment with μ-metal, it is particularly advantageous for the characteristic data for the magnetic field present inside the image converter tube to be derived using a known shielding factor or a known shielding function from the magnetic field measured outside of the image converter tube. Such shielding factors or shielding functions can in particular be contained in the evaluation model. They can possibly be determined in advance within the framework of a one-time calibration measurement. Apart from such shielding effects, the comparably slight spatial discrepancy between the mounting location of the magnetic field probe at the camera system and the inner chamber of the image converter tube is normally negligible since naturally inhomogeneities of the (Earth's) magnetic field are typically barely noticeable on such small scales.

The aforementioned object according to the invention also is achieved by an x-ray image intensifier system wherein a magnetic field probe that determines characteristic data of a magnetic field present in the image converter tube is arranged within the image converter tube or in its environment, an electronic evaluation unit connected on the data input side with the magnetic field probe and on the data output side with the image processing unit is provided that is configured such that, using the determined characteristic data, it quantitatively defines an imaging error resulting from the presence of the magnetic field, and based on this determines one or more correction parameters of a correction map leading to the correction of the imaging error, and the image processing unit is configured to apply the correction map established by the communicated correction parameters to the digital images.

The magnetic field probe is advantageously integrated into the camera system, like the electronic evaluation unit with the evaluation model implemented within it (for example as software).

The advantages achieved with the invention are in particular that—depending on the quality requirements—a previously obligatory μ-metal shielding of the image intensifier can be foregone, or this can be executed more simply. Since the μ-metal shielding requires both high material costs and complicated process steps, a cost reduction can thus be achieved. Alternatively, the concept according to the invention can be used in addition to a μ-metal shielding in order to further improve the image quality.

With regard to the compensation of the magnetic fields via a coil arrangement, the invention has the advantage that it can be realized more cost-effectively. The costs for the coil arrangement and the electronics to generate and regulate the currents are omitted. In the event that a correction of the static image deformation is already provided anyway in the image processing electronics, the model for the image deformation must essentially be implemented in addition apart from the connection of the magnetic field probe in hardware. The magnetic field probe can be integrated into the camera that is mounted on the image intensifier. A modification of the image intensifier itself is not necessary. This means that the type of compensation according to the invention can be applied in all image intensifier types.

Given the implementation according to the invention, the position of the image intensifier in space or relative to the existing magnetic fields does not have to be known. This is an advantage relative to those methods that conclude the deformations due to the magnetic fields from the known position in space. Compared to such methods, the realization according to the invention has the advantage that the prior complicated determination of the image deformations is done away with. A communication of the spatial position of the image intensifier by the system controller to the image processing electronics is not necessary, which makes a corresponding adaptation of the system controller unnecessary. Not least, a use in non-stationary systems is also possible given the realization according to the invention.

If the magnetic field probe is mounted on the camera, all necessary modules for the correction of the image deformation are thus implemented on or, respectively, in the camera. A reconstruction of the image intensifier unit is thereby unnecessary, and no additional mounting steps are incurred in the manufacturing. This also saves costs.

BRIEF DESCRIPTION OF THE DRAWINGS

FIG. 1 is a simplified depiction of the signal or information flow in an x-ray image intensifier system according to a first embodiment.

FIG. 2 shows a similar depiction for an x-ray image intensifier system according to a second, particularly preferred embodiment.

DESCRIPTION OF THE PREFERRED EMBODIMENTS

The x-ray image intensifier system 2 schematically depicted in FIG. 1 is a component of a medical x-ray diagnostic system (otherwise not additionally shown here). The x-ray image intensifier system 2 comprises an image converter tube 4 (also designated more concisely as an image converter or image intensifier). The image converter tube 4 in its simplest form comprises an entrance window 6 effective as a photocathode, from which the incident x-ray radiation releases electrons upon operation. Within the evacuated image converter tube 4, the electrons released in this way are accelerated via a high voltage applied between the cathode and an associated anode, and possibly are multiplied via a microchannel plate or the like (secondary electron multiplication). The electrons accelerated in this manner finally strike a luminescent screen 8 at the output side. An electro-optical mapping of the spatial intensity distribution of the x-ray radiation striking the input window 6 to the luminescent screen 8 of the output window thereby ensues, wherein the x-ray radiation that are not visible to the human eye is converted into a visible image and intensified. Given a corresponding design of the spectral sensitivity of the photocathode, the image converter or image intensifier can also be designed to visualize infrared or ultraviolet radiation.

The light distribution at the exit window (luminescent layer 8) of the image intensifier 4 is focused via an optic 10 into an image receiver or image sensor 12 of a digital camera 14. The image sensor 12 can be a CCD sensor or a CMOS sensor, for example. The digital camera 14 is appropriately a video camera that outputs a continuous digital video stream with comparably high frame rate of, for example, 25 frames per second or more. However, it is also possible to provide a digital camera designed for a single image acquisition instead of a video camera. The "raw" digital images or the digital video signal that is acquired in such a manner are supplied to an electronic (digital) image processing unit 16 in order to suitably prepare them before their display or additional processing with means for digital image processing, for example in order to conduct a brightness correction, to rotate the images etc. The video signal post-processed in this manner is then shown on a display or monitor (not depicted) of an associated display system.

The x-ray image intensifier system 2 according to FIG. 1 is designed for a particularly reliable and relatively simple-to-realize correction of imaging errors within the image converter tube 4. Primarily counted among these are image deformations due to the presence of magnetic fields in the evacuated inner chamber of the image converter tube 4 that, as a result of the Lorentz force, affect the flight path of the electrons emitted at the cathode and that normally cannot be shielded against in spite of a μ-metal shield around the tube body.

For this purpose the x-ray image intensifier system 2 according to FIG. 1 possesses a magnetic field probe 18 mounted within the image converter tube 4 or outside in its proximity, which magnetic field probe 18 measures the magnetic field strength and direction predominating at the attachment location. The measurement values are supplied to an electronic evaluation unit 20 as input variables. This can be a specialized electronic module or a freely programmable computer, for example, in which the provided evaluation routines are stored as executable programs and run as needed. The evaluation implemented in this way comprises a description according to a model and/or in tabular form between the measured magnetic field and the image deformation caused by this in the image converter tube 4. The connections can be derived—for example empirically determined or "theoretically"—from physical laws. Given an attachment of the magnetic field probe 18 outside of the image converter tube 4, the shielding of the field at the tube body or at its shielding covering is possibly also taken into account. Furthermore, systematic (in particular magnetic field-independent) static imaging errors that are caused by the image converter tube 4 itself or by the downstream optic 10 and that are known (for example from calibration measurements or from theoretical considerations) are taken into account in the evaluation model.

Based on the connection implemented according to the model between the characteristic magnetic field data and the image deformation resulting from these, a suitable correction map that cancels the image deformation ("de-skewing") is determined in the evaluation unit 20. For example, this can ensue in the manner that a suitable combination is determined from a basic set of elementary transformations (for instance deformation, scaling, rotation) implemented in the image processing unit 16 and associated transformation parameters are calculated. The parameters so determined are passed to the image processing unit 16, which then executes the desired transformation (i.e. applies it to the individual images of the digital video stream). The described evaluation and correction procedures thereby preferably run in real time (in any case in a good approximation) so that a current image of the brightness distribution at the luminescent screen 8 of the image converter tube 4 (and thus of the x-ray intensity distribution at its entrance window 6) that is cleared of deformation is always shown by the output video signal output by the image processing unit 16.

The variant depicted in FIG. 2 corresponds (from a functional standpoint) to that according to FIG. 1. In this system according to FIG. 2, the magnetic field probe 18, the evaluation unit 20 and the image processing unit 16 are not components separate from the digital camera 14 but are rather integrated into this in the manner of a compact interconnected structure. Naturally, it is also possible that the evaluation unit 20 is not strictly separated from the image processing unit 16 and is connected with it via interfaces, but rather partially or entirely coincides with it or possesses "overlaps" with it in the form of commonly used software modules or the like. The imaging optics 10 can likewise be integrated into the camera system (or even into the image intensifier) as needed. The camera system is advantageously firmly connected to the image intensifier or, respectively, mounted at the interposed optic 10 but can be detached (and therefore exchanged) as needed. The entire x-ray image intensifier system 2 is advantageously pivotable or, respectively, movable in space as a unit, in particular depending on the position of the x-ray source (not shown).

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for correcting imaging errors in an x-ray intensifier system comprising an image converter tube that converts incoming x-ray radiation into visible light, and a digital camera system that is optically downstream of said image converter tube, said digital camera system comprising an image sensor that converts said visible light into a digital image, and comprising an electronic image processor that processes said digital image, said method comprising the steps of:

mounting a magnetic field probe at a fixed location on or in said x-ray converter tube;

with said magnetic field probe, separately detecting a characteristic of each component of a multi-component magnetic field that is present in an environment in which said image converter tube is located, the components of said multi-component magnetic field respectively causing deformations in orthogonal directions in said digital image, and emitting probe output signals from said magnetic field probe that respectively represent the separately detected characteristic of the respective components;

supplying said probe output signals to an imaging error processor and, in said imaging error processor, analyzing said characteristics and automatically quantifying an imaging error in each said orthogonal directions resulting from said magnetic field;

in said imaging error processor, automatically determining at least one parameter of a correction map, dependent on the quantified imaging error in each said orthogonal directions, that corrects the quantified imaging error in each said orthogonal directions; and supplying said correction map to said image processor and, in said image processor, correcting said digital image in each said orthogonal directions using said correction map.

2. A method as claimed in claim 1 comprising, in said imaging error processor, quantifying said imaging error dependent on said probe output signals using a mathematical model.

3. A method as claimed in claim 2 comprising, in said imaging error processor, using a model, as said mathematical model, that incorporates current operating parameters of said image converter tube.

4. A method as claimed in claim 3 comprising selecting said current operating parameters from the group consisting of operating voltage and electro-optical parameters.

5. A method as claimed in claim 1 comprising, in said imaging error processor, quantifying said imaging error using a stored table comprising table contents representing different quantified imaging errors associated with different characteristics of said magnetic field, said table being generated by calibration measurements for said image converter tube.

6. A method as claimed in claim 1 comprising magnetically shielding said image converter tube with magnetic shielding having a known shielding capability selected from the group consisting of a shielding factor and a shielding function, and locating said magnetic field probe on said x-ray converter tube outside of the magnetically shielded image converter tube and, in said imaging error processor, quantifying said imaging error based on said characteristic, using said known shielding capability.

7. A method as claimed in claim 1 comprising detecting said characteristic, quantifying said imaging error, and correcting said digital image in real time during acquisition of said digital image.

8. A method as claimed in claim 1 comprising, in said image processor, correcting said digital image for additional image errors, in addition to said image error resulting from said magnetic field.

9. A method as claimed in claim 1 comprising mounting said magnetic field probe at said fixed location inside said image converter tube.

10. An x-ray image intensifier system comprising:

an image converter tube that converts incoming x-ray radiation into visible light;

a digital camera system that is optically downstream of said image converter tube, said digital camera system comprising an image sensor that converts said visible light into a digital image;

an electronic image processor that processes said digital image;

a magnetic field probe mounted at a fixed location in or on one of said image converter tube or said digital camera system, said magnetic field probe being configured to separately detect a characteristic of each component of a multi-component magnetic field that is present in an environment in which said image converter tube is located, the components of said multi-component magnetic field respectively causing deformations in orthogonal directions in said digital image, and to emit probe output signals that respectively represent the separately detected characteristic of the respective components;

an image error processor supplied with said probe output signals, said imaging error processor being configured to analyze said characteristics and automatically quantify an imaging error in each said orthogonal directions resulting from said magnetic field;

said imaging error processor also being configured to automatically determine at least one parameter of a correction map, dependent on the quantified imaging error in each said orthogonal directions, that corrects the quantified imaging error in each said orthogonal directions, and to supply said correction map to said image processor; and said image processor being configured to correct said digital image in each said orthogonal directions using said correction map.

11. An x-ray image intensifier system as claimed in claim 10 wherein said magnetic field probe is integrated into said digital camera system.

12. An x-ray image intensifier system as claimed in claim 10 wherein said imaging error processor is integrated into said digital camera system.

13. An x-ray image intensifier system as claimed in claim 10 wherein said magnetic field probe is mounted at said fixed location inside said image converter tube.

* * * * *